Oct. 7, 1924.
B. F. BETTS
1,510,823
ANTITHEFT DEVICE
Filed May 29, 1922
2 Sheets-Sheet 1
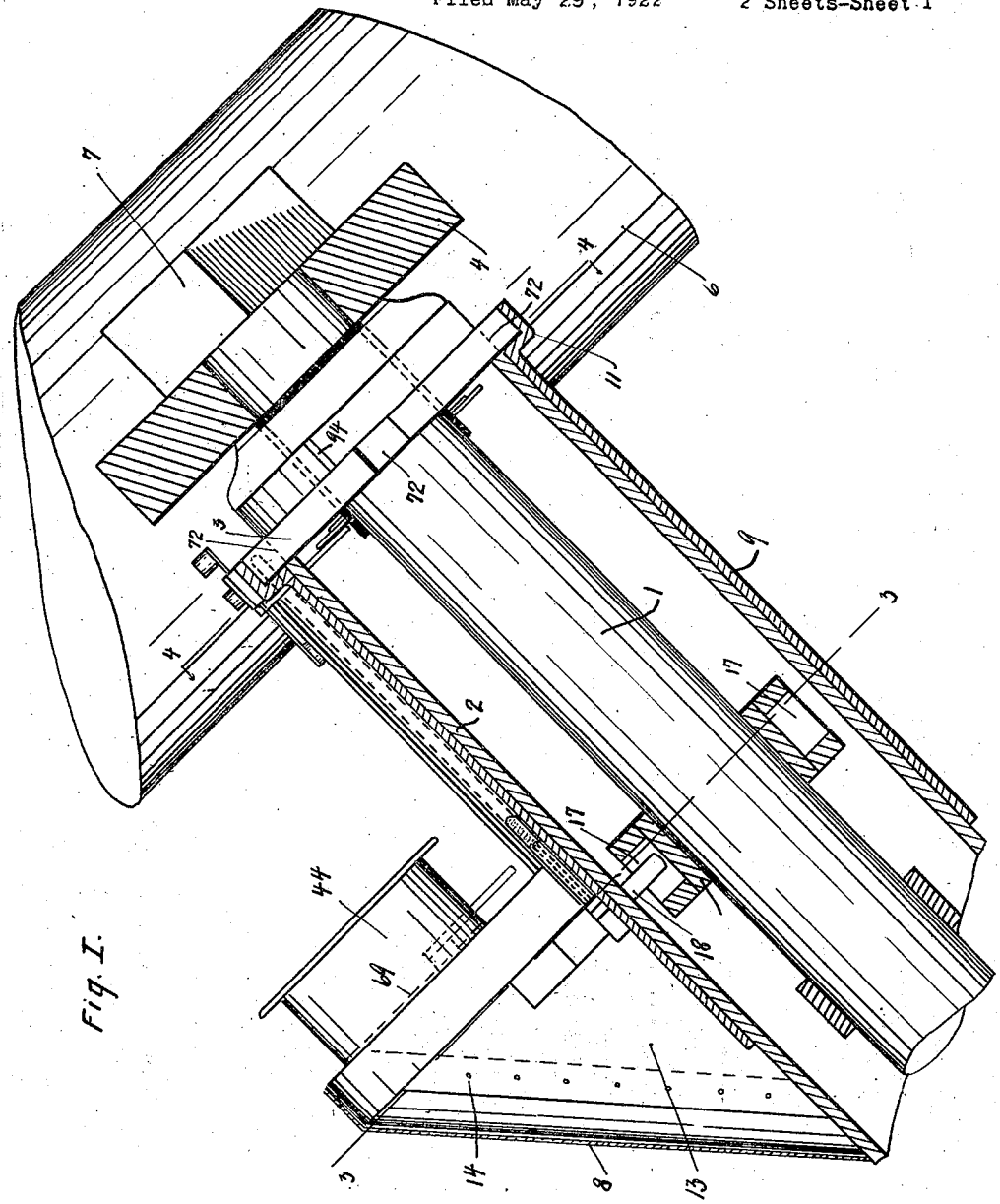
Fig. I.
INVENTOR
B. F. BETTS Oct. 7, 1924.                                                    1,510,823
B. F. BETTS
ANTITHEFT DEVICE
Filed May 29, 1922        2 Sheets-Sheet 2
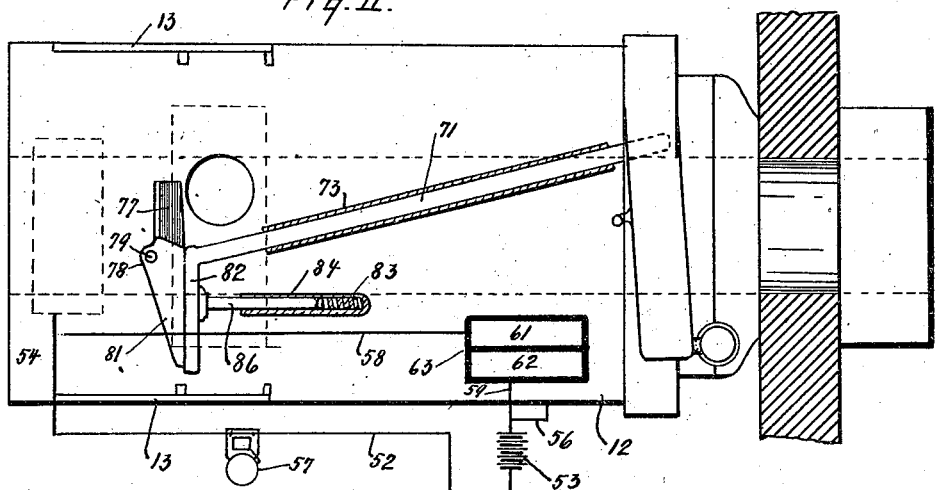
Fig. II.
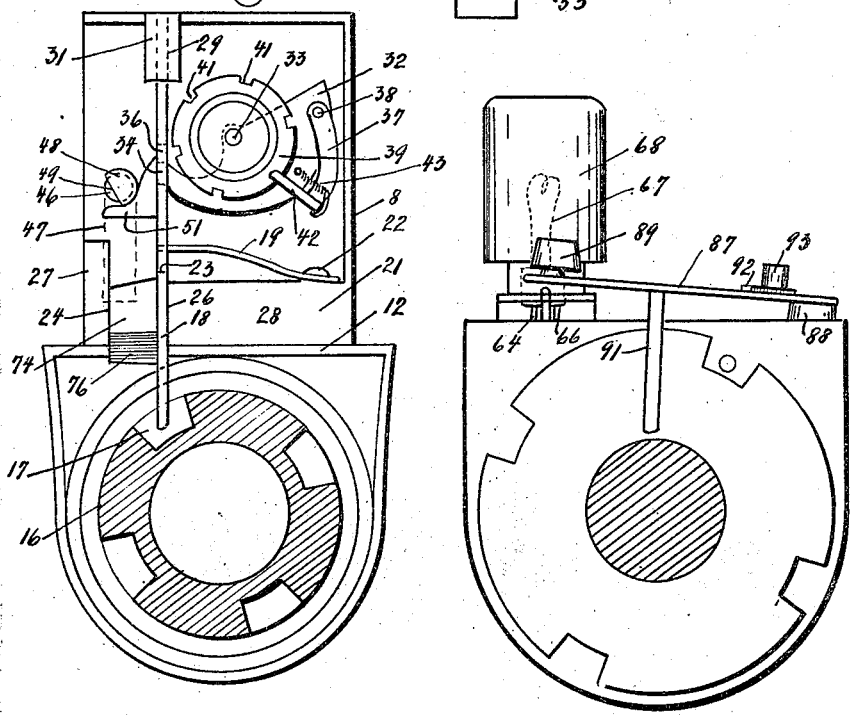
Fig. III.
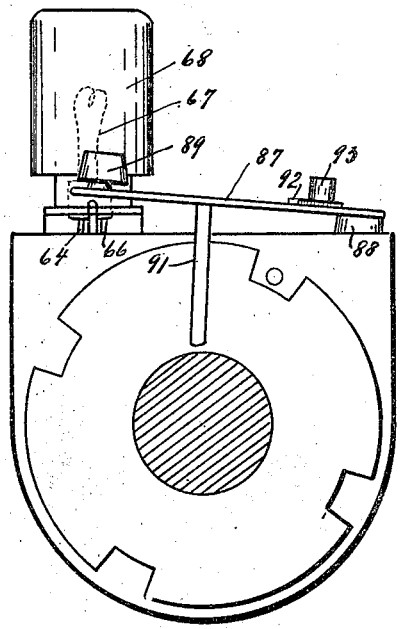
Fig. IV.
INVENTOR
B.F. BETTS Patented Oct. 7, 1924.

1,510,823

UNITED STATES PATENT OFFICE.

BENJIMAN FRANKLIN BETTS, OF SAN FRANCISCO, CALIFORNIA.

ANTITHEFT DEVICE.

Application filed May 29, 1922. Serial No. 564,412.

*To all whom it may concern:*

Be it known that I, BENJIMAN FRANKLIN BETTS, a citizen of the United States, and a resident of San Francisco, county of San Francisco, and State of California, have invented a new and useful Antitheft Device, of which the following is a specification.

The present invention relates to improvements in antitheft devices for motor vehicles and has particular reference to a device of the character described to be used in connection with the steering rod of the vehicle. The particular object of the invention is to provide positive locking means for the steering rod controlled by a lock mounted on the casing. A further object of the invention is to introduce a double locking means operated by a single working mechanism, and to have means associated therewith which will sound an alarm whenever an attempt is made to turn the steering post while it is locked. A further object of the invention is to provide means using the alarm system for operating the same independently of the lock whereby the alarm system may be simultaneously used as a signalling device. Further objects and advantages of my device will appear as the specification proceeds.

The preferred form of the invention is illustrated in the accompanying drawing, in which Figure 1 shows a vertical cross section through my device as secured to the steering post of a motor vehicle; Figure 2 a top plan view of the same with the cover of the housing removed; Figure 3 a cross section along line 3—3 of Figure 1, and Figure 4 a cross section along line 4—4 of Figure 1. While only the preferred form of the invention is shown in the drawing, it should be understood that various changes or modifications may be made within the scope of the claims hereto attached without departing from the spirit of the invention.

The steering post (1) as shown in Figure 1 is protected by the casing (2) surrounding the same and is provided with a flange (3) engaging and closing the top of the casing. The hub (4) of the steering wheel (6) is secured to the post above the flange and held in place by any suitable means, as by the nut (7).

The housing (8) for my device consists of a sleeve (9) adapted to be slid on the casing so that an upper flange (11) of the sleeve provides a seat for the flange (3) of the steering post. The top of the sleeve is flattened so as to provide a platform (12) shown in Figure 2 for the support of my locking mechanism. From this platform rise two flanges (13) in parallel and spaced relation adapted to have the cover (14) secured thereto whereby my locking mechanism is enclosed on all sides. The cover (14) is preferably riveted to the flanges (13) so as to allow of the removal of the cover by means of proper tools, but not without tools, the idea being that the owner of the motor vehicle should be able to remove the cover in order to change the combination of the lock, while a burglar would probably not have sufficient time to remove the cover for the purpose of tampering with the lock.

The steering post (1) is provided with a sleeve (16) having a plurality of peripheral recesses (17) therein which are adapted to be engaged by the bolt (18) of the lock for locking purposes. The bolt (18) is normally held in engagement with one of the recesses (17) by means of the spring (19), one end of which is secured to a block (21) within the housing (8) by any suitable means, as by the rivet (22), while the free end engages a projection (23) on the bolt (18) and normally forces the same downwardly. The bolt is guided vertically between the two walls (24) and (26) of the blocks (27) and (28) mounted in the housing, and its upper end slides in a vertical recess (29) in the block (31) supported near the top of the housing. It is disengaged from the recess by means of a lever (32) pivotally supported on the shaft (33), one end (34) of the same engaging a projection (36) on the bolt (18), and a pawl (37) pivotally depending from the other end, as shown at (38), being actuated by the wheels (39) of a combination lock to pull the latter end downwardly. The combination lock may be of any known type and is shown in the drawing as comprising a plurality of wheels having circumferential notches (41) therein which may be brought into alinement with each other by the use of the combination. One set of these notches is thereby brought into opposite relation to the plate (42) associated with the end of the pawl (37) and the latter is forced into this set of notches by means of a spring (43). After this engagement has been perfected the operator may turn the shaft (33) by means of the cylindrical member (44) projecting outside the housing whereby the bolt is lifted.

To maintain the bolt in its upward position I use the pin (46) supported in the wall of the housing and provided on the outside of the housing with a handle (47). This pin has a tapered head (48), a portion of which is cut away along a straight line (49) so as to slant into the pin. This pin is tapered to engage a projection (51) extending sideways from the bolt and to hold the same in its upward position by means of its tapered head (48). But when the pin is turned by means of the handle (47) the slanting portion (46) of the same is brought into contact with the projection (51) and allows the same to ride down on its slanting face forcing the pin, which is slidably supported in its bearing, outwardly and passing the same.

The operation of the device thus far illustrated may be described as follows: Normally the bolt (18) is kept in engagement with the recess (17) in the collar (16) by means of the spring (19). To disengage the bolt the operator first causes a set of notches (41) of the wheels (39) in his lock to register by the use of his combination key, when the spring (43) will force the plate (42) in engagement with this set. He then turns the wheel (39) clockwise as viewed in Figure 3 by means of the cylindrical member (44) whereby the bolt is lifted out of its engagement with the recess (17). During this operation the projection (51) of the bolt has passed the pin (46) which latter is pushed inwardly by the operator and engages the projection with its tapering head (48). The bolt is now locked in its upper position. If the driver desires to use his lock again he only needs to turn the pin (46) by means of the handle (47) until the slanting cut-away portion of the pin is brought into engagement with the projection (51), when the latter will ride downwardly on the same pushing the pin (46) outwardly and engaging the recess (17) under the influence of the spring (19).

It will be noticed that the recess (17) in the collar (16) is considerably larger than the diameter of the bolt (18) so as to allow of a certain amount of play of the steering post even if the same is locked. I utilize this feature for the purpose of sounding an alarm in case a person should attempt to drive the motor vehicle while the same is locked in the following manner: Both the steering post (1) and the platform (12) are electrically energized from any suitable source of power, as indicated in Figure 2, in which a lead line (52) is shown as connecting the battery (53) with a sleeve (54) on the steering post, and another lead (56) connecting the same battery with the platform. The latter contacts with the bolt (18) so that when an attempt is made to turn the steering post one of the walls of the recess (17) will contact the bolt (18) and thereby close a circuit adapted to ring the bell (57). The same source of power is connected by means of wires (58) and (59) to two contact plates (61) and (62) insulated from the platform (12) as shown at (63), which latter are adapted to be engaged by two contacts (64) and (66) of a lamp (67) mounted in the housing (68), which latter lamp is disposed in such a manner as to shed its light into the cylinder (44) at the bottom of which a dial (69) is provided to be used in working the combination of the lock. The object of mounting the dial at the bottom end of the cylinder is to allow the same to be seen only by a person looking at it directly so that the driver of the machine may work the combination without allowing another person sitting in the machine to watch him.

The device thus far described had reference to one bolt (18) only which co-operates with recesses in the collar (16). If desired, my device allows of the use of a second bolt (71) mounted on the platform (12) longitudinally and adapted to engage recesses (72) in the flange (3) of the steering post. The bolt is slidably secured in a guide member (73) and is operated by means of the same lock previously described. It will be noted that the bolt (18) where it penetrates the platform (12) has a block (74) secured thereto which presents a slanting lower surface (76) adapted to engage, during the travel of the bolt, a corresponding slanting surface (77) of a lever (78) pivotally secured to the platform as shown at (79). The other end (81) of the lever engages a transverse projection (82) of the bolt (71) and forces the latter into engagement with one of the recesses in the flange (3), when the slanting surface (77) is pressed sideways by the bolt (18) during its downward travel, thereby locking the steering post in two different places. When the pressure of the bolt (18) on the slanting surface (77) of the lever (78) is released the bolt (71) is disengaged from its recess by means of the spring (83) in the guide (84) pushing on a pin (86) engaging the projection (82) of the bolt.

As a special feature of my device I may mention the bell ringing mechanism comprising a transverse spring (87) mounted on the platform in front of the driver. One end of the spring rests on the metallic support (88) while the free end carries a button (89). When the driver presses on this button he thereby forces a pin (91) extending downwardly from the spring through the housing and the casing in contact with the steering post thereby completing a circuit and ringing the bell (57). To allow the driver to maintain the spring (87) in its bell ringing position I provide a second spring (92) with a button (93) thereon which may be moved over the spring (87) so as to hold the same down.

It has been noted that the engagement between the bolt (18) and the recess (17) is used for sounding an alarm when a person attempts to turn the steering post while the same is locked. The driver of course normally does not wish to sound the alarm while he performs the locking operation, and I therefore provide means in the indicating strips (94) mounted on the flange of the steering post for advising the driver whether or not the bolt (18) occupies a central position relative to the recess (17) and may be inserted into the same without touching the walls and thereby sounding the alarm.

I claim:

1. An anti-theft device for a motor vehicle having a steering post, a casing enclosing the same and a flange on the steering post for closing the top of the casing, comprising a collar on the steering post having a peripheral recess therein, a corresponding recess in the flange, a radial bolt slidably supported so as to extend through the casing adapted to engage the recess in the collar and to thereby lock the post, a longitudinal bolt slidably supported outside the casing adapted to engage the recess in the flange so as to lock the bolt, spring means tending to simultaneously operate the two bolts with their respective recesses, and manually operated, lock-controlled means for simultaneously disengaging the bolts.

2. An anti-theft device for a motor vehicle having a steering post, a casing enclosing the same and a flange on the steering rod for closing the top of the casing, comprising a collar on the steering post having a peripheral recess therein, a corresponding recess in the flange, a cylinder adapted to be slid on the casing having a housing associated therewith, a radial bolt slidably supported in the housing so as to extend through the casing adapted to engage the recess and to thereby lock the post, a longitudinal bolt slidably supported in the housing adapted to engage the recess in the flange so as to lock the bolt, spring means tending to simultaneously operate the two bolts with their respective recesses, and manually operated, lock-controlled means for simultaneously disengaging the bolts.

3. An anti-theft device for a motor vehicle having a steering post, a casing enclosing the same and a flange on the steering rod for closing the top of the casing, comprising a collar on the steering post having a peripheral recess therein, a corresponding recess in the flange, a cylinder adapted to be slid on the casing having a housing associated therewith, a cap for the housing offering limited resistance to its removal, a radial bolt slidably supported in the housing so as to extend through the casing adapted to engage the recess and to thereby lock the post, a longitudinal bolt slidably supported in the housing adapted to engage the recess in the flange so as to lock the bolt, spring means tending to simultaneously operate the two bolts with their respective recesses, and manually operated, lock-controlled means for simultaneously disengaging the bolts.

4. A lock for the steering post of a motor vehicle comprising a bolt slidably mounted for locking engagement with the steering post, yielding means normally effecting the engagement, a lever arranged to lift the bolt out of the engagement, a rotary combination lock mounted coaxially with the lever and an operative connection between the lever and the lock whereby the lever is engaged when the lock is adjusted to a predetermined combination and may then be turned by the lock.

5. A lock for the steering post of a motor vehicle comprising a bolt slidably mounted for locking engagement with the steering post, yielding means normally effecting the engagement, a lever arranged to lift the bolt out of the engagement, a rotary combination lock mounted coaxially with the lever presenting a plurality of notches adapted to be alined by working the combination, and a pawl depending from the lever arranged to enter the alined notches for allowing the lever to be operated by turning the rotary lock.

6. In a device of the character described, a slidably mounted latch bolt having yielding means associated therewith for urging the same into an active position and manually operated means for withdrawing the same, a lateral projection extending from the bolt and a transversely mounted sliding pin adapted to engage with the projection, the pin being formed for selective adjustment to either lock the latch bolt in an inactive position or to be forced out of its path by the latter, when the same is urged into an active position.

7. In a device of the character described, a slidably mounted latch bolt having yielding means associated therewith for urging the same into an active position and manually operated means for withdrawing the same, a lateral projection extending from the bolt and a transversely mounted sliding pin adapted to engage with the projection, the pin being formed with a head for holding the projection with a portion of the head tapered away to allow the latch bolt, when urged into an inactive position, to force the pin out of its path provided the latter has been turned.

8. In a combination lock of the character described, means for simultaneously operating two transversely arranged latch bolts comprising yielding means urging one of the latch bolts into an active position, a lever pivoted to engage the second bolt with one arm for thrusting the same into an active position and a slanting engagement between the other arm of the lever and the first latch bolt whereby the latter actuates the former.

BENJIMAN FRANKLIN BETTS.